United States Patent [19]

Smith

[11] Patent Number: 4,528,637
[45] Date of Patent: Jul. 9, 1985

[54] DATA ACQUISITION SYSTEM AND ANALOG TO DIGITAL CONVERTER THEREFOR

[75] Inventor: Yoav M. Smith, Pittsburgh, Pa.

[73] Assignee: Westinghouse Electric Corp., Pittsburgh, Pa.

[21] Appl. No.: 389,512

[22] Filed: Jun. 17, 1982

[51] Int. Cl.³ .............................................. G01K 7/16
[52] U.S. Cl. ................................... 364/557; 324/105; 374/1
[58] Field of Search .................... 364/557, 571, 573; 374/1-4, 114, 128; 340/870.21, 347 CC; 324/105

[56] References Cited

U.S. PATENT DOCUMENTS

| | | | |
|---|---|---|---|
| 3,905,229 | 9/1975 | Togo et al. | 364/571 |
| 4,102,199 | 7/1978 | Tsipouras | 364/557 |
| 4,349,821 | 9/1982 | Vancsa | 340/870.21 |
| 4,380,757 | 4/1983 | Vancsa | 340/347 CC |

OTHER PUBLICATIONS

Technischessen 38-1981 (4), pp. 27-130, "Multichannel Temperature Measuring Device for Pt. 100 Resistance Thermometers", W. Corius.

Primary Examiner—Raulfe B. Zache
Assistant Examiner—Dale M. Shaw
Attorney, Agent, or Firm—Charles Lorin

[57] ABSTRACT

An RTD bridge is coupled with a microprocessor-based data acquisition system for linear reading of temperature and for accuracy at the level of the precision data acquisition system. A reference divider is paralleled with the RTD bridge between a voltage reference source and ground, and linearization is effected in accordance with a function which is a geometric progression of the measured non-linear count. Calibration is effected in one embodiment with a precision divider, or with the bridge itself by making readings at the lowest and at the highest temperature intended with the bridge, according to another embodiment of the invention.

2 Claims, 6 Drawing Figures

DATA ACQUISITION SYSTEM AND ANALOG TO DIGITAL CONVERTER THEREFOR

BACKGROUND OF THE INVENTION

The present invention relates to temperature monitoring in general, and more particularly to data acquisition systems involving resistance thermometer devices (RTD) at multiplexed measuring points.

Modern technology uses for industrial process monitoring high resolution data acquisition systems operating in a multiplex fashion among a plurality of analog data measuring points. When resistance thermometer devices (RTD) are involved at several of the multiplexed measuring points, the inherent non-linearity of the RTD bridge makes difficult the incorporation of such a bridge in the data acquisition system, in particular on account of the inaccuracy and the drift occurring after bridge calibration.

The present invention enables high accuracy temperature measurements with an RTD bridge which makes the latter compatible with high resolution data acquisition systems.

The invention also provides for an improved method for coupling new RTD bridges in any measuring channel for consistent and accurate data processing by a data acquisition system, thereby to allow very accurate measurements with reduced hardware requirements and at low cost.

A further object of the present invention is to facilitate the use of RTD bridges for individual measuring points with a high-resolution data acquisition system in such a way that quality measurement behind the measuring channels is maximized without stringent requirements in the manufacture of the circuit and components at the channel locations.

The invention makes use of a microprocessor which is used within the data acquisition system for calibration and linearization within the limits of a full scale range of measurement at the desired resolution range.

It is known from U.S. Pat. No. 4,349,821 issued Sept. 14, 1983 to George I. Vancsa for "Data Acquisition System and Analog to Digitial Converter Therefor" to calculate, with a microprocessor, constants which define the range and resolution of measurement by a data acquisition system as a function of a reference voltage which intervenes only as a ratio between reference and measurement at the point of analog measurement. It is also known that RTD bridges are inherently non-linear, so that correction is necessary in order to compensate for such non-linearity within the given scale of measurement. In particular, it has been proposed to use a polynomial of the second degree in order to translate the non-linearity into a linear function. See for instance "Technisches Messen 48, 1981 Issue No. 4, pages 127-130 by W. Carius under the title "Multichannel Temperature Measuring Device With Linearization for Pt. 100-Resistance Thermometers".

SUMMARY OF THE INVENTION

The present invention resides in a method of ascertaining the response, to a given bridge involving a particular resistance thermometer device (RTD), of a data acquisition system, comprising the steps of: establishing, with said data acquisition system and a reference voltage divider mounted between a voltage reference source and ground, a full scale range of measurement; effecting, with said data acquisition system and a high precision voltage divider incorporating said RTD device across said voltage reference source and ground, a zero and a full sclae measurement as defined by said first step; calculating with a microprocessor the error in said reference voltage divider by comparison to said high precision voltage divider; measuring, with said given bridge and particular RTD device, temperature at a measurement location to derive through said data acquisition system a data measurement; correcting said data measurement in accordance with the calculated error; and correcting said corrected data by linearization with said microcomputer in accordance with a selected function.

DESCRIPTION OF THE PREFERRED EMBODIMENT

Figure 1:
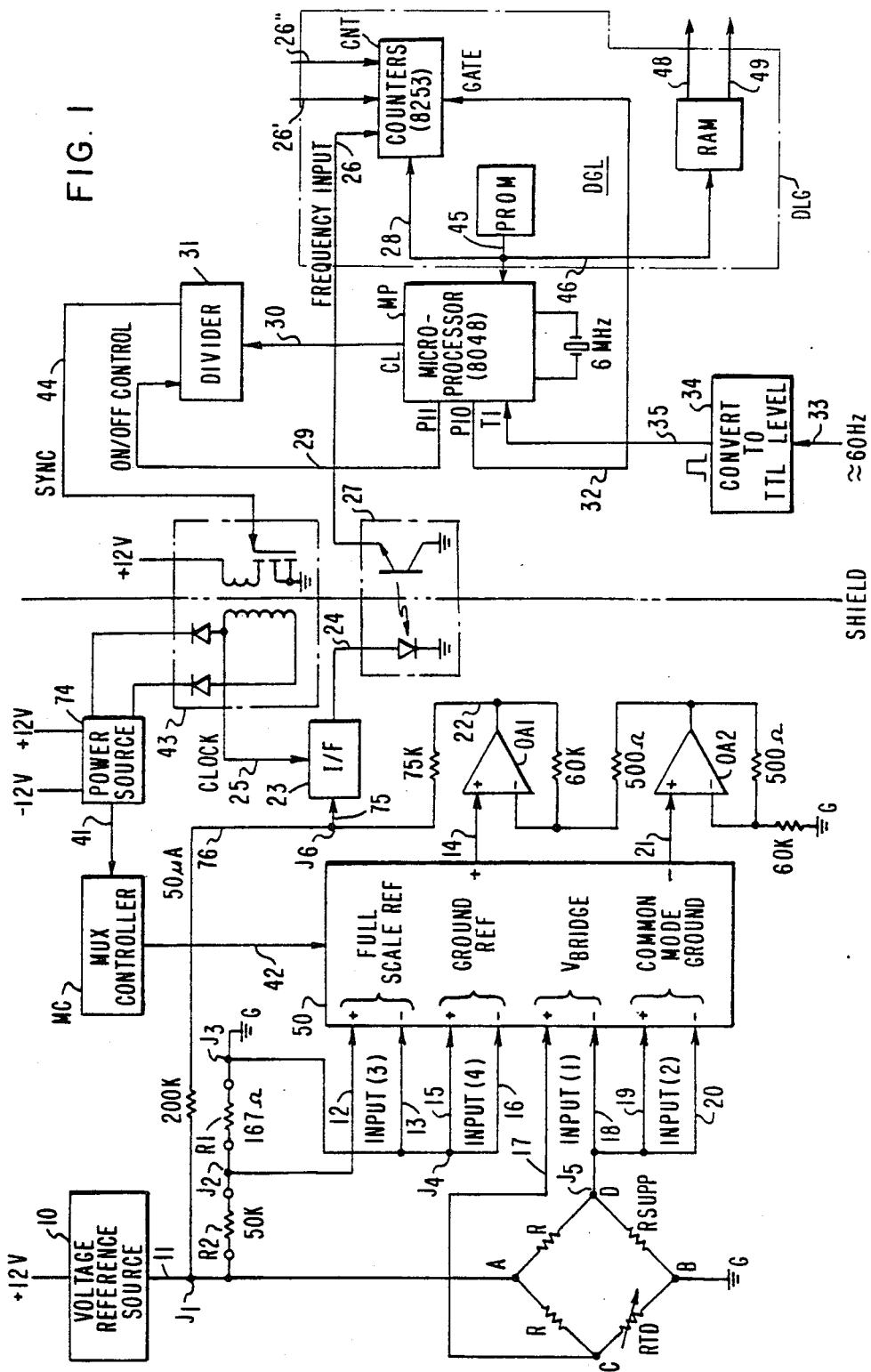
FIG. 1 is a multiplexed data acquisition system involving RTD analog data derived with a reference voltage divider and a reference voltage in accordance with the prresent invention.

Measurement of temperature (T) at a measuring point location for one channel of measurement is performed with a resistance thermometer device RTD shown in FIG. 1 mounted into a bridge between nodes B and C. The bridge has a diagonal AB mounted between a reference voltage, typically of 10 volts, provided by a reference source 10 via line 11 and junction $J_1$, and ground G. The unbalance in the bridge due to a particular temperature T on the RTD device is detected across the diagonal CD between lines 17 and 18.

A reference divider comprised of a series network of resistors ($R_2$, $R_1$) connected between junction $J_1$ and ground G is provided in order to establish, between line 12 from junction $J_2$ which is common to resistors $R_2$ and $R_1$ and line 13 from grounded end and junction $J_3$ of resistor $R_1$, a reference voltage which is a given ratio of the source voltage.

When $R_2$ is 50 kΩ and $R_1$ is 167 Ω, the divider provides between lines 12 and 13 a voltage which is 1/300 of the 10 volt voltage of line 11, e.g. at junction $J_1$.

It is assumed that the bridge includes between both nodes AC and AD, the same resistance R=60 kΩ, that the RTD device inserted between nodes BC, when exposed to the maximum temperature intended $T_{hot}$, measures 300 Ω, and that between nodes BD a resistance $R_{supp}$ is inserted of 100 Ω which is equal to the resistance $R_{cold}$ of the RTD device at the lowest temperature intended to be measured, e.g., $T_{cold}$. Under such assumption the voltage across diagonal CD, e.g., between lines 17 and 18 will be, when $T=T_{hot}$, $$\frac{300\Omega - 100\Omega}{R} = \frac{200}{60 \text{ K}\Omega} = \frac{1}{300}$$

of the voltage across the AB diagonal, e.g., 1/300 of the voltage at $J_1$. Therefore, between lines 12, 13 of divider $R_2$, $R_1$ appears the same ratio 1/300 of the reference voltage as between lines 17, 18 of the RTD bridge. If the reference voltage is 10 volt, such derived mesurement is $1/300 \times 10 = 33 \frac{1}{3}$ millivolts. When the RTD device detects $T_{cold}$ temperature, resistive branches ACB andd ADB in the bridge are symmetrical in values. Therefore, the value of the voltage across diagonal CD is zero.

The voltages derived on lines (12, 13) and (17, 18) are used as respective inputs #3 and #1 to a data acquisition system. According to general practice, a second input #2 is associated between lines 19 and 20 with input #1, which corresponds to the common mode ground from junction $J_5$ relative to node D of the bridge, and a second input #4 is associated between lines 15, 16 with input #3, which corresponds to the grounded point at $J_3$, $J_4$ and on line 13 from divider ($R_1$, $R_2$).

A data acquisition system is responsive to inputs #1, #2, #3 and #4 through a multiplexer 50 controlled by line 42 from a multiplexer controller MC so as to choose in sequence any of the inputs #1, #2, #3, and #4. The data acquisition channel includes, as shown in FIG. 1, two operational amplifiers $OA_1$, $OA_2$, mounted in a differential arrangement. $OA_1$ is responsive to the positive output line 14 and $OA_2$ is responsive to the negative output line 21 from the multiplexer. Operational amplifier $OA_1$ conveys on its output line 22 a signal representative of whatever input has been connected by the multiplexer, namely input #1, 2, 3, or 4 for the illustrated measurement channel. The analog value derived on line 22 at a given moment is converted into a frequency signal by a current-to-frequency (I/F) converter 23, synchronized by a clock signal on line 25. The pulses from the (I/F) converter 23 on line 24 are transferred across an isolation medium 27 onto line 26.

The data acquisition system of FIG. 1 has a common digital side including counters CNT, PROM, RAM and other logic components associated with the microprocessor MP to make a digital logic DGL. The analog channels have an isolated floating ground. A pulse transformer, as shown in the Vancsa application, is continuously pulsed from the digital side. The secondary is rectified to provide power to the analog channels and the 10 volt reference source 10 associated with the RTD bridge. The microprocessor is able to abruptly stop the pulsing of the primary for a short duration so as to generate control pulses which switch the multiplexer 50 from one to the next of the four inputs #1, #2, #3, and #4. The floating ground allows the RTD bridge to be connected to the field ground.

When the multiplexer has been pulsed to one of the four inputs, the selected voltage input signal is amplified, between zero and 4 volts, converted to current on line 22 and summed at junction J6 with a 50 μA bias current from line 76. The summed current on line 75 is converted by the (I/F) converter 23 to a proportional number of pulses which are transferred to the associated counter within circuit CNT on the digital side. The bias current of 50 μA represents the full scale input current (since 4 volts ÷ 80K equal 50 μA), thus enabling maximum normal node noise amplitude. The pulses of lines 24 and 26 are counted and stored as a count by a counter within counting circuit CNT. Such count is characteristic of the analog signal amplitude on line 75. Counting circuit CNT is responsive to similar frequency signals on lines 26', 26" from the other channels.

The data acquisition system is, thus, connected to a plurality of remote analog inputs for monitoring and control from a central location and in digital form by a computer. For the purpose of this description, the aforementioned U.S. Pat. No. 4,349,821 of George Vancsa is hereby incorporated by reference. For each multiplexer stage like in FIG. 1, the data acquisition system transmits through an isolation transformer of the selected channel a series of pulses (like on line 26 of FIG. 1) which are received and stored in an associated counter (like at CNT of FIG. 1). These counts are then treated as digital data by a central computer for offset correction, calibration, scaling and measurement data processing.

Preferably, all the channels with the associated transformers and DC power supply units such as 74 are mounted on a common board with a central timer and digital data processing unit in the form of a microcomputer MCP, like shown in FIG. 1.

The digital logic DGL includes a PROM, a RAM and a microprocessor MP which are interrelated for performing an algorithm involving stored counts derived on line 45 from the counter circuit CNT. The microprocessor operation is synchronized with the clock circuit 43 and SYNC signal of line 44 by a divider 31 and the clock signal of line 30. The microprocessor is a solid state device 8048. It establishes from port 11 an ON/OFF control status by line 29 and gates the counter circuit CNT by line 32. It also addresses the counters by internal bus 28 and the RAM by bus 46. The microprocessor receives the counts from bus 28 and transmits data to the RAM by bus 46. The PROM is connected to the microprocessor by bus 45. By making use of a collective board having the central timer and digital processing unit, a compact and light structure exists which includes low cost hardware components in the various channels. The precision and sophistication requirements are centered around the central timer and the microcomputer.

While such a data acquisition system can be easily plugged as a subsystem into the overall control and computerized system of a general process control having so many remote measuring units as there are channels, the problem remains with RTD measurement points to be able to derive signals, such as on line 22 of FIG. 1, which can be read as counts to derive a true temperature measured by the RTD bridge. In this regard, one requirement is linearization of the RTD bridge output.

As shown in the aforementioned G. Vancsa U.S. patent a reference source and counter have been used to determine by testing a set of four constants in order to achieve during calibration and testing a linearization of the transfer function through the data acquistion system within the full scale range of measurement. Also, from the aforementioned Carius article in Technisches Messen 48, No. 4, 1981, it is known to use a polynomial function to linearize an RTD bridge, the compensation being effected by a feedback loop built around the operational amplifier deriving the measurement output signal.

It is now proposed to use the microprocessor of the data acquisition system in order to perform an algorithm which compensates for the inherent linearity of the RTD bridge. This technique is combined with a special calibration technique which allows any definite RTD bridges to be plugged with the data acquisition system at the calibrated measuring point, the correct information to be derived immediately. A direct advantage of such approach is the elimination of hardware tuning devices required in the prior art, and an increased reliability at reduced cost. Periodic calibration readings can be effected without being influenced by any change or variation in the reference voltage source used for calibration. For a given temperature T on the bridge of FIG. 1, the resistance thermometer device across nodes BC, has a resistance $(RTD) = R_i$ which is to be determined from the voltage V bridge derived between lines 17, 18 across nodes CD.

$$V_{bridge} = \frac{V_{ref} \times R_i}{R + R_i} - \frac{V_{ref} \times R_{cold}}{R + R_{cold}} \quad (1)$$

This equation expresses the unbalance of the bridge between the cold condition, when $(RTD) = R_{cold}$, and the present condition resistance $(RTD) = R_i$ under the common voltage reference $V_{ref}$ from junction $J_1$ to ground. If $R >> RTD$ equation (2) becomes $$V_{bridge} = \frac{V_{ref}}{R}(R_i - R_{cold}) \quad (2)$$

In the example earlier given: resistance $(RTD) = R_{hot} = 300\Omega$; resistance $(RTD) = R_{cold} = 100\Omega$. $R = 60\ K\Omega$. Under the simple formula (2), this makes the bridge output $V_O$ for the maximum expected that equal exactly to 1/300 of the reference voltage, e.g., $V_O$ is the voltage reference $V_{ref}$ of source 10 divided by the same ratio K as input #3 from the divider $(R_1, R_2)$. When $RTD = R_{hot} = 300\Omega$, the data acquisition system reads full scale (1000)H. However, in practice, the voltage $V_O$ between lines 17, 18 is governed by equation (1), not by equation (2). Equation (1) is not linear. Therefore, for $T_{hot}$ the value $R_{hot}$ does not lead to exactly a full scale reading (1000)H. The same nonlinearity affects any intermediary value $R_i$. Under the example given of $R_{hot} - R_{cold} = 300 - 100 = 200\Omega$ the lack of linearity appears as follows:

| | Formula (2) $V_{bridge} = \frac{V_{ref} \cdot R}{R}$ | | Formula (1) $V_{bridge} = V_{ref}\left(\frac{RTD \times R - R_{cold} \times R}{R + RTD\ R + R_{cold}}\right)$ | | |
|---|---|---|---|---|---|
| | | Output Linear | | Output Real | Counts off Linearity |
| 300 | $\frac{V_{ref}}{300}$ | 1000 | $\frac{V_{ref}}{302}$ | 0FE4 | 28 |
| 250 | $\frac{V_{ref}}{400}$ | 0C00 | $\frac{V_{ref}}{402}$ | 0BEE | 18 |
| 200 | $\frac{V_{ref}}{600}$ | 0800 | $\frac{V_{ref}}{603}$ | 07F5 | 11 |
| 150 | $\frac{V_{ref}}{1200}$ | 0400 | $\frac{V_{ref}}{1205}$ | 03F8 | 5 |
| 100 | 0 | 0000 | 0 | | 0 |

Figure 2:
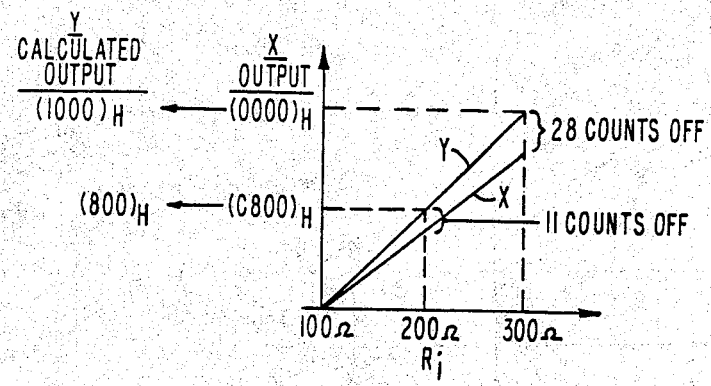
FIG. 2 shows the relation between the output of the RTD bridge of FIG. 1 and the linear curve which matches the intended scale of temperatures.

This is translated by the curves Y and X of FIG. 2; where Y is the linear count and X the non-linear count. The following polynomial is used to transfer the measured non-linear count $X_i$ into a linear count $Y_i$:

$$Y_i = B_0 + B_1 X_i + B_2 X_i^2 + \sum_{n=3}^{\alpha} B_j X_j. \quad (3)$$

The calculation leading to equation (3) is as follows:

The general formula (1), which is non-linear, leads to an output $V_O$ between lines 17, 18, e.g., at input #1 from nodes CD of the bridge for a temperature $T_i$ and a resistance $R_i$ between nodes BC of the bridge. Equation (1) can be rearranged as follows:

$$V_0 = \frac{V_{ref} R_i}{R + R_i} - \frac{V_{ref} R_{cold}}{R + R_{cold}} = \frac{V_{ref}(R_i - R_{cold})R}{(R + R_i)(R + R_{cold})}$$

$$= \frac{V_{ref}(R_i - R_{cold})R}{R^2 + R(R_i + R_{cold}) + R_i R_{cold}}$$

Since $R_i R_{cold}$ is negligible in the denominator by comparison to the two first terms thereof, the last expression of equation (1) becomes:

$$V_0 = \frac{V_{ref}(R_i - R_{cold})R}{R[R + (R_i + R_{cold})]} = \frac{V_{ref}(R_i - R_{cold})}{R\left(1 + \frac{R_i + R_{cold}}{R}\right)} \quad (4)$$

$R_i - R_{cold} = \Delta R$, e.g., the increase in resistance from the initial value $R_{cold}$ at $T = T_{cold}$. By substitution into the upper and the lower terms to eliminate $R_i$, equation (4) becomes:

$$V_0 = \frac{V_{ref} \times \Delta R}{R\left(1 + \frac{2R_{cold} + \Delta R}{R}\right)} \quad (5)$$

Using the denomination $$A = \left(1 + \frac{2R_{cold}}{R}\right)$$

in equation (5), the new formulation reads:

$$V_0 = \frac{V_{ref} \times \Delta R}{R\left(A + \frac{\Delta R}{R}\right)} \quad (6)$$

Figure 4:
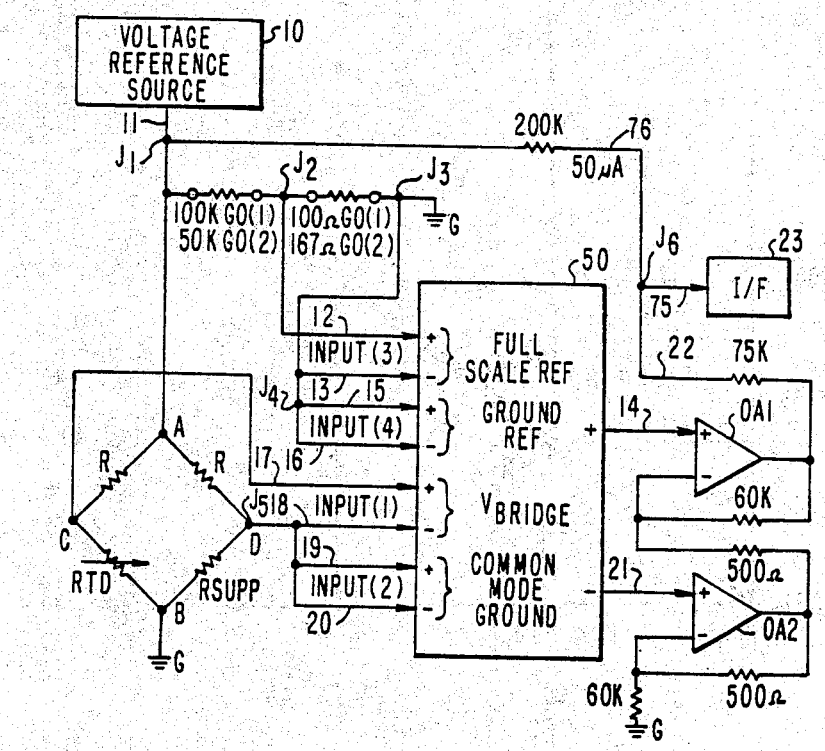
FIG. 4 shows the system of FIG. 1 with a reference voltage divider having two settings depending upon the type of RTD bridge used.

It is observed that $V_{ref} \Delta R/R$ is precisely the output $V_l$ between lines 17, 18 if, instead of following curve X in FIG. 4, the measuring point reading were on line Y according to equation (2). Therefore, equation leads to the formulation of $Y = V_l$ in terms of $X = V_O$ as follows:

$$V_l = V_{ref} \frac{\Delta R}{R} = V_{ref} \frac{V_0 A}{(V_{ref} - V_0)} = \frac{V_0 A}{\left(1 - \frac{V_0}{V_{ref}}\right)} \quad (7)$$

Equation (7) shows that the linear value $V_l$ corresponding to the measured non-linear output $V_O$ is obtained by calculating:

$$\frac{V_0 A}{\left(1 - \frac{V_0}{V_{ref}}\right)}$$

It is further observed that $(V_O/V_{ref})$ can be written as $1/Z$, where $Z = V_{ref}/V_O$. In the particular example of a divider $(R_1, R_2)$ of ratio 1/300 under the voltage reference $V_{ref}$ we know that for a 12-bit accuracy reading the data acquisition system will provide a full scale reading of $4096 = V_{ref}/300$. For the reading $V_O$, $V_O = V_{ref}/Z$. Therefore, $Z = 4096 \times 300/V_O$. Accordingly, $$V_I = Y = \frac{V_0 A}{\left(1 - \frac{V_0}{V_{ref}}\right)} \quad V_0 A \times \left(\frac{1}{1 - \frac{1}{Z}}\right) \quad (8)$$

$$= V_0 A \left(1 + \frac{1}{Z} + \left(\frac{1}{Z}\right)^2 + \left(\frac{1}{Z}\right)^3 + \ldots\right)$$

which uses the series development of the function $$1/1 - \frac{1}{Z} \text{ of root} \left(\frac{1}{Z}\right).$$

Equation (8) can be identified with equation (3) by observing that $V_I = Y$; $V_O = X$;

$$Z + \frac{4096 \times 300}{V_0}$$

which leads from (8) to $$Y = XA + XA \times \frac{X}{4096 \times 300} + XA \times \frac{X}{4096 \times 300}^2 + \ldots$$

If $B_0 = 0$; $B_1 = A = (1 + 2R_{cold}/R)$; $B_2 = A \times (1/4096 \times 300)$; $B_3 = A \times 1/(4096 \times 300)^2$; etc., the polynomial function of X becomes translated in terms of the afore-mentioned equation (3).

In the example given, namely with $R_{cold} = 100\Omega$; $R_{hot} = 300\Omega$; $R = 60$ K$\Omega$; which entails $K = 1/300$ for the full scale derivation from the $V_{ref}$ voltage, $B_1 = 1.00333$; $B_2 = B_1/300 \times 4096 = 0.0000008$.

Equation (3) is reduced to the second degree in this example. More generally, depending upon the particular RTD bridge and the desired accuracy, more terms can be used.

In the example given, equation (3) is used with coefficients $B_0 = 0$, and $B_1$, $B_2$ as numerically calculated hereabove. These values are burnt into the PROM device of the Digital Logic DGL and are to be used by the microprocessor. For each value $X_i$ derived at input #1 (for an instantaneous resistance $R_i$ and temperature $T_i$ on the bridge), the microprocessor, based on the count derived from counter CNT, calculates the value $Y_i$ defined by equation (3), thereby raising the operative point from curve X to curve Y of FIG. 2. Therefore, when the bridge is coupled with the data acquisition system as shown on FIG. 1, linear values are automatically derived for each value X detected at input #1 of the multiplexer, thereby allowing proper control and monitoring of the overall industrial process.

As a result typical values of X and Y derived for five values of $R_i$ at 50$\Omega$ from one another, are as follows:

| $R_i$-Input | Ideal Output | Actual Output | Corrected Output Using Polynomial |
|---|---|---|---|
| 300$\Omega$ | 4096 | 4096 | 4096.082 |
| 250$\Omega$ | 3072 | 3054 | 3071.7955 |
| 200$\Omega$ | 2048 | 2037 | 2047.178 |
| 150$\Omega$ | 1024 | 1019 | 1023.22 |
| 100$\Omega$ | 0 | 0 | 0 |

Having determined with the microprocessor MP the corrected value Y, the corrected value of $R_i$ is given by the relation:

$$R_i = R_{cold} + \frac{Y}{4096} \times (R_{hot} - R_{cold}) \quad (9)$$

It is known that $R_i$ in an RTD device is a nonlinear function of the measured temperature $T_i$. Such nonlinearity can be compensated by the use of the digital logic DGL of the data acquisition system. Coefficients of a polynomial will be burnt in the PROM device so that the microprocessor can compute the corrected value of $T_i$, as $R_i$ is derived from equation (9), automatically.

As earlier shown, when choosing an RTD bridge carrying between nodes BC and RTD deivce, the values of the resistances in the bridge for $T_{cold}$ are chosen to be symmetrical in values about the node line AB. Therefore, for $T_{cold}$ the voltage derived between nodes C and D will be zero volts. Thus, between nodes B and D, resistor $S_{supp}$ is equal to $R_{cold}$ of the RTD device in the opposite branch, while a resistor R has been placed in each of the branches AC and AD defining a divider ratio. Having insured a zero reference both for the zero input #4 of reference divider $(R_1, R_2)$ and the RTD bridge at $T_{cold}$ on input #1, it remains to insure an exact correspondence between the full scale reading from the reference divider $(R_1, R_2)$ at input #3 and the $T_{hot}$ reading from input #1.

Referring again to FIG. 1, it is a fact that, unless the divider $(R_1, R_2)$ is built with very high precision and source 10 generates a precise voltage as a reference voltage, the counts effected at inputs #3 and #4 with the data acquisition system, will not provide an invariant voltage translated into counts for zero and full scale. In hexadecimal representation, using a 12-bit resolution, full scale is (1000)H corresponding to 4096, while zero on the scale is (0000)H. Zero is established by construction for $R_{cold}$ and $T_{cold}$. Calibration is needed in order to ascertain a true value at full scale by the data acquisition system.

Figure 3:
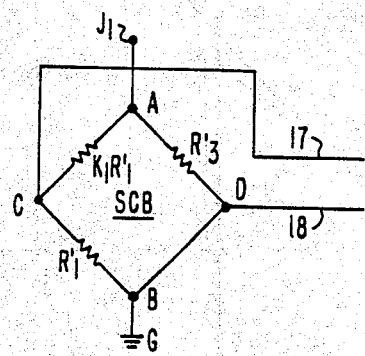
FIG. 3 is a high-precision calibration bridge used to calibrate the response through full scale of the voltage divider of FIG. 1.

For the purpose of calibrating the reference resistor divider $(R_1, R_2)$ a calibration divider SCB shown in FIG. 3 is substituted for the measuring bridge of FIG. 1 during a "standard calibration" procedure performed initially with the data acquisition system. Standard calibration divider SCB is a high-precision series network comprising between nodes BC a resistor $R'_1$ of precise value and between nodes AC another resistor of precise value $K_1R'_1$, where $K_1 = 299 \pm 0.01\%$. The divider also includes between nodes BD a resistance which is nil, while between nodes AD a resistor $R'_3 = K_1R'_1 \pm 1\%$ is provided accounting for the differential input of the operational amplifiers $OA_1$, $OA_2$.

At input #1, e.g., between CD, as well as between BC, the calibration divider provides a calibration voltage $v_c$ which is exactly a fraction $$K = \frac{R'_1}{R'_1 + K_1 R'_1} = \frac{1}{300}$$

of the reference voltage $V_{ref}$ of source 10. Accordingly, when reading input #2 with the calibration divider, the count $C_{gc}$ derived for the common mode ground corresponds to a zero reading (0000)H, whereas when reading input #1 the derived count $C_{FSc}$ corresponds to a full scale reading (1000)H by the data acquisition system. By comparison, the count $C_g$ for the ground input #4 with the reference divider ($R_1$, $R_2$) and the full scale reading $C_{FS}$ for the full scale reading input #3 provide a measurment $C_{FS} - C_g$ which is not exactly $C_{FSc} - C_{gc}$. Therefore, the full scale reading (1000)H with the divider $R_1$, $R_2$ should be corrected by the inverse ratio $$\frac{(C_{FS} - C_g)}{(C_{FSc} - C_{gc})}.$$

Taking the instantaneous measurement X at input #1 with the bridge of FIG. 1, the data acquisition system uses the four inputs #1–#4 together with the reference divider ($R_1$, $R_2$), reading $C_i$ for $X_i$ and taking a full reading (1000)H on input #3. The output X will be:

$$X = (1000)H \times \frac{C_i - C_{gc}}{C_{FS} - C_g} \left[ \frac{C_{FS} - C_g}{C_{FSc} - C_{gc}} \right] = \quad (10)$$

$$(1000)H \times \frac{C_i - C_{gc}}{C_{FSc} - C_{gc}}$$

With the calibration divider, at input #1 is derived a voltage input $X_{cal}$ applied to the data acquisition system which satisfies the general linear formula:

$$X = A_0 + A_1 \frac{C_i - C_{gc}}{C_{FS} - C_g}. \quad (11)$$

Applied to the calibration test, formula (11) becomes:

$$X_{cal} = A_0 + A_1 \frac{C_{FSc} - C_{gc}}{C_{FS} - C_g}$$

Initially $A_0 = (0000)H$ and $A_1 = (1000)H$. Therefore, $$\frac{C_{FS} - C_g}{C_{FSc} - C_{gc}} = \frac{(1000)H}{X_{cal}} \quad (12)$$

From equation (10) it appears that the corrected values are $A'_0 = O$; and:

$$A'_1 = A_1 \times \frac{C_{FS} - C_g}{C_{FSc} - C_{gc}} = A_1 \times \frac{(1000)H}{X_{cal}}$$

after, equation (12), and $$A'_1 = \frac{(1000000)}{X_{cal}}$$

The latter value is burnt into the PROM and used after calibration for all measuring phases.

As a result, any error which otherwise would appear in the full scale and zero level of a reading with reference divider ($R_1$, $R_2$) is automatically corrected. Measurement of X involves a standard bridge hooked on the data acquisition system and a divider ($R_1$, $R_2$) of low cost fabrication. The voltage source 10 may vary, since it intervenes both at the top and at the bottom of a ratio.

The microprocessor continuously reads input (1). Periodically, it reads inputs (2), (3), and (4) for automatic calibration. In order to monitor the input closely, it is suggested to use a scheme as follows:

input (1), input (1), - - -, input (1), input (2), input (1), (16 times)

input (3), input (1), input (4), input (1), input (1), input (1)

Since each input is ON for 400 milliseconds, using this scheme will guarantee going away from the input for a maximum duration of 400 milliseconds. The goal being a 12-bit resolution output, the formula carried out by the microprocessor is $$X = A_0 + A_1 \frac{C_1 - C_2}{C_3 - C_4} \quad (13)$$

where $C_1$ is a count relative to input #1, $C_2$ is a count relative to input #2, etc. . . . , and where initially $A0 = (0000)H$ and $A1 = (1000)H$.

The current-to-frequency (I/F) ratio is $2 \times 10^8$. Thus, full-scale input will produce $100 \times 10^{-6} \times 2 \times 10^9 = 20,000$ counts, while the ground inputs will produce about 10,000 counts.

Referring to FIG. 4, two sets of values for divider ($R_1$, $R_2$) are illustratively given which correspond to a range of values GO(1) where $R_2 = 100K\Omega$ and $R_1 = 100\Omega$, thereby to make the divider provide at junction $J_1$ a ratio $K = 1/1000$ of the reference voltage $V_{ref}$. The other set of values $GO_{(2)}$ shown in FIG. 4 is the one given for the afore-mentioned ratio of $K = 1/300$, namey $R_2 = 50K\Omega$ and $R_1 = 167\Omega$. Taking into account the ratio of $K = 1/1000$ in the setting $GO_{(1)}$ of divider ($R_1$, $R_2$), the values of R, of resistance (RTD) and Rsupp in the intended bridge are chosen in the manner described hereabove for the $GO_{(2)}$ setting of the reference divider. In the same fashion, the calibration divider will have $K_1 = 999 \pm 0.01\%$  $R'_2 = K_1 R'_1$ and $R'_3 = K_1 R'_1 \pm 1\%$. The RTD bridge will be such that the values of R in relation to the RTD device resistances at $T_{cold}$ and $T_{hot}$ provide a divider ratio $K = 1/1000$. Accordingly, in the polynomial equation (3), instead of 300, constant $B_2$ will be:

$$B_2 = \frac{B_1}{1000 \times 4096}$$

More generally, the same method is used in selecting any bridge, choosing values R and Rsupp which match the $\Delta R$ range between $R_{hot}$ and $R_{cold}$ for the particular RTD device, in order to have a ratio K approximating the chosen range, like GO(1), GO(2) in the examples given. Once the calibration has been done with a precision bridge like the one of FIG. 3, all it takes is to compute with the microprocessor the corrected value of X, then, compute the corrected value of Y, then, determine the value of $R_i$.

It is observed that when calibrating with the calibration divider, as well as when measuring with the RTD bridge, the derivation of data involves the ratio of the difference of the counts stored in relation to inputs #1 and #2 to the difference of the counts stored in relation to inputs #3 and #4, thereby eliminating the importance of the voltage reference $V_{ref}$ which does not require to be a voltage source having a very high degree of stability. It is also noted that the calibration steps provide for a precise reference, despite the use during measurement of an imperfect reference divider. On the other hand, during measurements with the reference divider, the ratio approach permits the elimination of the influence of the drift.

Referring to FIG. 1, it is assumed, according to another embodiment of the invention, that, rather than using a calibration divider as shown hereabove by reference to FIG. 3, the RTD bridge itself is used for calibration, namely, as a custom calibration.

Figure 5:
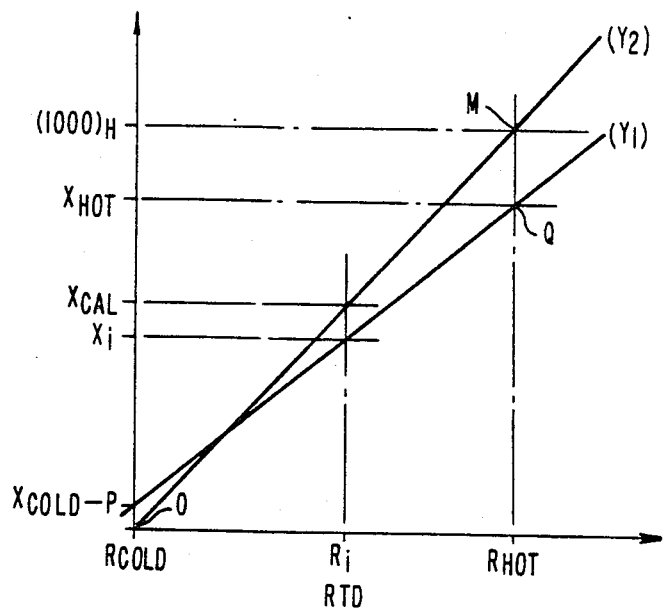
FIGS. 5 and 6 relate to another embodiment of the invention. They illustrate with curves a second method of calibration using the RTD bridge itself.

In the case of FIG. 3 it was assumed that the lowest reading was (0000)H, corresponding to an output zero. Accordingly, in equation (11), the constant $A_0$ was (0000)H expressing that the linear characteristic passes by zero. With the second embodiment, having plugged the custom resistance (RTD) bridge, the bridge is set 1) for RTD=$R_{cold}$ when T=$T_{cold}$; and (2) for resistance (RTD)=$R_{hot}$ when T=$T_{hot}$. At the same time, for the respective steps, outputs are derived by the data acquisition system, namely: $X_{cold}$ and $X_{hot}$. Referring to FIG. 5, line Y1 is a straight line passing by points P ($X_{cold}$, $R_{cold}$) and Q ($X_{hot}$, $R_{hot}$) on the X and $R_i$ axes of coordinates. P and Q are defined by steps 1) and 2) above. It is desired to follow ideally a line Y2 passing by the origin 0 ($X_{cold}$=0, $R_{cold}$=0) at zero output and by point M of coordinates $X_{hot}$=(1000)H, $R_{hot}$ at full scale. Mathematically, curve Y2 is derived from curve Y1 by the formula:

$$Y_2 = \frac{(1000)H \, Y_1}{X_{hot} - X_{cold}} - \frac{(1000)H \, X_{cold}}{X_{hot} - X_{cold}} \quad (14)$$

By comparison with equation (11) which applies to Y2 in the first embodiment, for Y1 the equation is in the form:

$$Y_1 = A'_0 + A'_1 X$$

where A'0 is not (0000)H but rather:

$$A'_0 = - \frac{(1000)H \cdot X_{cold}}{X_{hot} - X_{cold}}$$

while $A'_1$ is not (1000)H but rather:

$$A'_1 = \frac{(1000000)H}{X_{hot} - X_{cold}}$$

The microprocessor uses these two constants to derive the ideal linear function OM from the calibrated line PQ of the bridge.

Figure 6:
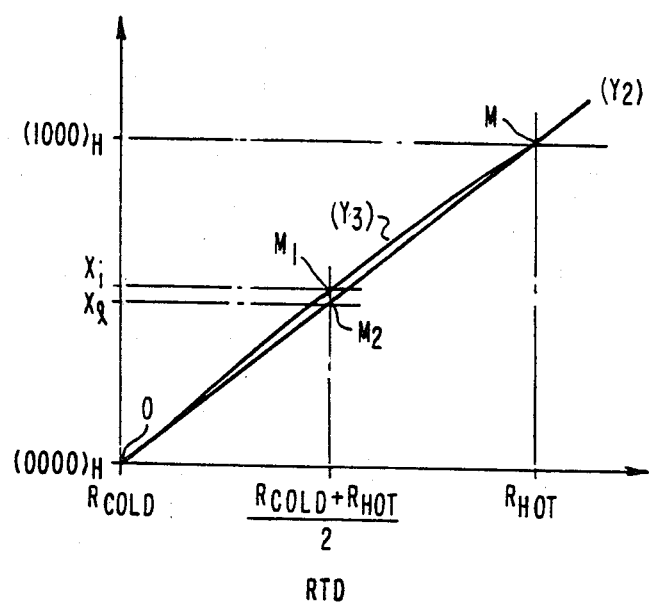

However, the transformed line is not exactly along Y1. In reality, it follows line Y3 of FIG. 6. Therefore, in lieu of converting $X_i$ into $X_{cal}$, the preceding method provides $X'_i$ which for $X_c$ linear is still away from the intended $X_{cal}$.

By appropriate calculations, it can be shown that the deviation from the perfect response Y1, or OM, has a maximum for an abscissa halfway between $R_{cold}$ and $R_{hot}$, which is $$\tfrac{1}{2} \frac{(R_{hot} - R_{cold})}{(R + R_{hot} + R_{cold})} \times X_i = (X_i - X_l)$$

where $X_l$ is the ideal ouput on the ideal line Y2. The deviation from linearity is given in general by:

$$\frac{X_l}{X_i} = 1 - \frac{(1 - 1/n)(R_{hot} - R_{cold})}{R + R_{hot} + R_{cold}} \quad (15)$$

where $$n = \frac{R_{hot} - R_{cold}}{R_i - R_{cold}}$$

a parameter defining how far the operative point on curve Y3 is before, or after, the middle point. Thus, for the middle point $M_1$ on curve Y3 relative to $R_2$ on curve Y2, in the example given in relation to FIG. 1, $R_i$=200Ω, n=2 and the output reading (4096/2 leads under equation (15) to:

$$2048 / \left[ 1 - \frac{(1 - \tfrac{1}{2}) \times 200}{60000} \right] = \frac{2048}{0.99833} = 2051$$

The deviation is only of 3 counts, which shows that the transformation of equation (14) is valid as a calibration.

If it is desired to compensate for this remnant of non-linearity, the following method may be used: first, the output is derived and n is established by dividing the full-scale reading 4096 by the output. This value is, thereafter, used in formula (15) to linearize the reading.

The steps involved in the custom calibration are:
(1) plug the RTD bridge to be used to determine temperatures with the data acquisiton system;
(2) store $A_0$=O and $A_1$=(1000)H
(3) take a reading of $R_{cold}$, deriving $X_{cold}$;
(4) take a reading of $R_{hot}$, deriving $X_{hot}$;
(5) calculate $A'_0$ and $A'_1$ as hereabove stated, using the previously obtained data under steps 1 to 4;
(6) burn into the PROM device the values of $A'_0$ and $A'_1$;
(7) use the microprocessor with the general formula when proceeding with the measuring steps of $X_i$;

When the power supply voltage reaches (+12 V) as applied, a reset pulse is generated. The microprocessor MP is reset. If addressed during reset, the digital logic DGL will return a zero bit ("0") in the most significant data-bit location indicating invalid data.

Eight hundred milliseconds after the power supply voltage has exceeded 10 volt, the reset is terminated. Microprocessor MP and the programmable counters CNT are initialized. A software timer is started to provide a "warm-up" delay of approximately 15 seconds. During this period of "warm-up", bit 15 is set to 0. A calibration counter is initialized to initiate a calibration cycle once every 16 input readings. The microprocessor takes 16 sequential readings of the bridge at inputs #1 and #2. Following each reading, the microprocessor executes the following formula:

$$\text{Percent Span} = A_0 + A_1 \frac{C_1 - C_4}{C_2 - C_3} \qquad \text{I}$$

where the counts are:

$C_{(i)}$—i=1, 2, 3, 4—counts obtained when multiplexer 50 is set to input #i. ($A_0$, $A_1$ are the zero offset and gain constants, respectively). After 16 readings of input #1 the microprocessor enters a calibration cycle. During this cycle the microprocessor proceeds with the following operations:

First the count $C_{FS}$ (full-scale input) is read and updated values are stored in the RAM. Then $C_2$ and $C_3$ are tested to see whether they are within an acceptable range 10,666±10%. If $C_2-C_3$ is out of range, bit 14 is set to 0. The microprocessor then goes back to take a reading from input #1 and the output is updated. The microprocessor switches to the ground input of input #3. After updating the values of $C_3$ in the RAM, the values $C_4-C_3$ and $C_3$ are tested to see whether they are within the acceptable range. If not, bit 14 is set to 0. The microprocessor goes back to input #1, obtains a reading and updates the output. Then, the multiplexer is switched to input #2 or common mode ground. $C_2$ is updated in the RAM and tested to see whether it is within acceptable range. If not, bit 14 is set to 0.

I claim:

1. In a system for monitoring temperature and deriving signals representative of temperatures sensed at a remote location with a Resistance Thermometer Device (RTD) having a resistance $R_i$ when exposed to a temperature $T_i$, the combination of:

a voltage reference source of voltage $V_{REF}$ at said remote location;

a voltage divider at said remote location connected between said voltage reference source and ground;

said voltage divider having an intermediate divider point situated thereon between said voltage reference source and ground;

a bridge at said remote location having two supply ends respectively connected to said voltage reference source and ground and having two measuring ends diagonally disposed relative to said supply ends, with said RTD being mounted in one branch of said bridge in relation to one of said measuring ends;

a data acquisition system having four inputs selected and remotely connected to said remote location through individual lines associated with one of said divider and bridge as follows:

a first input connected between said bridge measuring ends;

a second input connected to the other of said measuring ends for the derivation of common ground;

a third input connected between said intermediate divider point and ground;

a fourth input connected to ground as a reference ground therefor;

said data acquisition system having counter means for deriving a representative count in response to a selected said input;

where $C_i$ is the representative count when said first input is responsive to an input signal $X_i$, the voltage signal $X_i$ corresponding to the resistance $R_i$ and the temperature $T_i$;

where $C_{gs}$ is a count representative of ground derived from said third input when selected;

where $C_g$ is a common ground representative count derived from said fourth input when selected;

a microprocessor being provided operative with such count $C_i$ for computing a linearized representative value $Y_i$ of $X_i$ according to the formula:

$$Y_i = B_0 + B_1 X_i + B_2 X_i^2 + \sum_{n=3}^{\infty} B_n X_i^n \sum_{n=3}^{\alpha} B_j X_j$$

where:

$$B_0 = 0; \quad B_1 = 1 + \frac{2R_{cold}}{R};$$

$$B_2 = 1 + \left(\frac{2R_{cold}}{R}\right) \times \frac{1}{KFS};$$

$$B_3 = 1 + \left(\frac{2R_{cold}}{R}\right) \times \left(\frac{1}{KFS}\right)^2; \text{ etc.}$$

where $R_{cold}$ is the resistance value of $R_i$ for $T_i = T_{cold}$; where R is the resistance of a resistor in the bridge inserted in series between said RTD and said voltage reference source; where FS is the full-scale reading resolution of the data acquisition system; and where 1/K is a fraction representing the ratio of the voltage reference $V_{REF}$ from the voltage reference source to said full-scale reading resolution FS;

whereby from said second input is derived an input signal representing $V_{REF}/K$;

with said microprocessor being operative with said first, second, third and fourth selected input to compute $X_i$ by the formula:

$$X_i = \frac{C_i - C_g}{C_{FS} - C_{gs}} \times FS$$

and said microprocessor being operated, for each value $X_i$ so derived, to convert the computed count $X_i$ to a linear count $Y_i$.

2. The system of claim 1 with said data acquisition system being from time to time operated in a calibration mode; a calibration bridge being substituted for said RTD bridge and having a precision resistance $R'_i$ in place of said RTD device and a precision resistance $KR'_i$ in place of said resistance R, said data acquisition being operated to select said first input and to derive therewith a full scale count $C_{FSC}$ representing $V_{REF}/K$ and being operated to select said second input and to derive therewith a count $C_{gc}$; said microprocessor being operative to compute a corrective factor as follows:

$$\frac{C_{FS} - C_g}{C_{FSc} - C_{gc}}$$

from said counts $C_{FSc}$ and $C_{gc}$ derived with said calibration divider at full scale and at ground reading, respectively; said corrective factor being used by said microprocessor being operative to compute $X_i$ with the formula $$X_i = FS \times \frac{C_i - C_{gc}}{C_{FS} - C_g}.$$

* * * * *